(12) United States Patent
Grey

(10) Patent No.: US 8,784,984 B2
(45) Date of Patent: Jul. 22, 2014

US008784984B2

(54) MICROCAPSULES, THEIR USE AND PROCESSES FOR THEIR MANUFACTURE

(75) Inventor: Bryan David Grey, Bradford (GB)

(73) Assignee: Ciba Corporation, Tarrytown, NY (US)

( * ) Notice: Subject to any disclaimer, the term of this patent is extended or adjusted under 35 U.S.C. 154(b) by 909 days.

(21) Appl. No.: 12/446,332

(22) PCT Filed: Nov. 6, 2007

(86) PCT No.: PCT/EP2007/061933
§ 371 (c)(1),
(2), (4) Date: Apr. 20, 2009

(87) PCT Pub. No.: WO2008/058868
PCT Pub. Date: May 22, 2008

(65) Prior Publication Data
US 2011/0003152 A1 Jan. 6, 2011

(30) Foreign Application Priority Data

Nov. 17, 2006 (GB) .................................. 0622894.4
May 17, 2007 (GB) .................................. 0709421.2

(51) Int. Cl.
| | |
|---|---|
| *B32B 27/04* | (2006.01) |
| *A61K 9/50* | (2006.01) |
| *A61K 8/11* | (2006.01) |
| *A01N 25/28* | (2006.01) |
| *A61Q 17/04* | (2006.01) |
| *A01P 1/00* | (2006.01) |
| *C12N 11/00* | (2006.01) |
| *B32B 5/16* | (2006.01) |
| *C11D 17/00* | (2006.01) |
| *F21V 9/06* | (2006.01) |
| *C02F 5/10* | (2006.01) |
| *C09K 15/04* | (2006.01) |
| *B01J 13/18* | (2006.01) |
| *B05D 3/02* | (2006.01) |
| *B01J 13/14* | (2006.01) |
| *D06M 23/12* | (2006.01) |

(52) U.S. Cl.
CPC ................ *B01J 13/14* (2013.01); *B01J 13/185* (2013.01); *D06M 23/12* (2013.01)
USPC ........ 428/321.5; 252/180; 252/388; 252/399; 252/589; 264/4.7; 435/174; 424/59; 424/70.9; 424/408; 424/419; 424/451; 427/389.9; 428/402.2; 510/438; 512/4

(58) Field of Classification Search
USPC ............. 428/321.5, 402.2; 424/59, 70.3, 401, 424/408, 419, 451; 435/174; 510/438; 252/589, 180, 388, 399; 512/4; 264/4.7; 427/389.9
See application file for complete search history.

(56) References Cited

U.S. PATENT DOCUMENTS

| | | |
|---|---|---|
| 3,615,972 A | 10/1971 | Morehouse |
| 3,912,792 A | 10/1975 | Touval |
| 4,105,823 A | 8/1978 | Hasler et al. |
| 4,798,691 A | 1/1989 | Kasai et al. |
| 4,861,539 A | 8/1989 | Allen et al. |
| 5,011,634 A | 4/1991 | Pietsch et al. |
| 5,292,835 A | 3/1994 | Jahns et al. |
| 5,320,835 A | 6/1994 | Pahlck et al. |
| 5,382,433 A | 1/1995 | Pahlck et al. |
| 5,456,852 A | 10/1995 | Isiguro |
| 5,498,345 A | 3/1996 | Jollenbeck et al. |
| 5,508,025 A | 4/1996 | Hoshino et al. |
| 5,728,760 A | 3/1998 | Rose et al. |
| 6,200,681 B1 | 3/2001 | Jahns et al. |
| 6,531,160 B2 * | 3/2003 | Biatry et al. .................. 424/490 |
| 6,620,235 B1 | 9/2003 | Knowles et al. |
| 2002/0058732 A1 | 5/2002 | Mistry et al. |
| 2003/0018102 A1 | 1/2003 | Weston et al. |
| 2003/0118822 A1 | 6/2003 | Jahns et al. |
| 2004/0234738 A1 | 11/2004 | Jahns et al. |
| 2004/0245661 A1 | 12/2004 | Hunt et al. |
| 2006/0051425 A1 * | 3/2006 | Kvitnitsky et al. ........... 424/490 |
| 2006/0281834 A1 | 12/2006 | Lee et al. |
| 2007/0224899 A1 | 9/2007 | Dungworth et al. |

FOREIGN PATENT DOCUMENTS

| | | |
|---|---|---|
| DE | 19959806 | 6/2001 |
| EP | 0269393 | 6/1988 |
| GB | 1507739 | 4/1978 |
| GB | 2073132 | 3/1981 |
| JP | 62-127336 A | 6/1987 |
| WO | 98/50002 | 11/1998 |
| WO | 99/24525 | 3/1999 |
| WO | 01/54809 | 8/2001 |
| WO | 03/035245 | 5/2003 |
| WO | 2005/002719 | 1/2005 |
| WO | 2005/105291 | 11/2005 |
| WO | WO 2005/105291 | * 11/2005 |

OTHER PUBLICATIONS

English Language abstract of DE 19959806 from the esp@cenet web site printed on Jun. 12, 2009.
Great Britain Search report dated Mar. 27, 2007.

* cited by examiner

*Primary Examiner* — Gerard Higgins
*Assistant Examiner* — Sathavaram I Reddy
(74) *Attorney, Agent, or Firm* — Shruti Costales

(57) ABSTRACT

A microcapsule comprising A) a core containing a hydrophobic liquid or wax, B) a polymeric shell comprising a) a polymer formed from a monomer mixture containing: i) 1 to 95% by weight of a hydrophobic mono functional ethylenically unsaturated monomer, ii) 5 to 99% by weight of a polyfunctional ethylenically unsaturated monomer, and iii) 0 to 60% by weight of other mono functional monomer, and b) a further hydrophobic polymer which is insoluble in the hydrophobic liquid or wax. The invention includes a process for the manufacture of particles and the use of particles in articles, such as fabrics, and coating compositions, especially for textiles.

22 Claims, No Drawings

MICROCAPSULES, THEIR USE AND PROCESSES FOR THEIR MANUFACTURE

The invention relates to microcapsules that have a core surrounded by a polymeric shell in which the core contains a hydrophobic liquid or a hydrophobic wax. The shell is formed from hydrophobic mono functional ethylenically unsaturated monomer, polyfunctional ethylenically unsaturated monomer, optionally other monomer and a further hydrophobic polymer. In the invention the core may comprise an active ingredient such as ultra violet (UV) absorbers, flame retardants or phase change substances. Desirably the particulate compositions can easily be incorporated into a variety of products such as coatings, sun-screens or a variety of textile products.

There are many instances where it would be desirable to provide capsules comprising a shell surrounding a core material. For instance the core may comprise an active ingredient which is released slowly, such as fragrances, pesticides, medicaments and the like. In other instances it may be desirable for the core material encapsulated within the shell to remain substantially intact either permanently or at least until a suitable trigger induces the core to be released. There are instances where it is important that the core material is not released from the capsules. This includes for example encapsulated ultra violet light absorbers for use in sunscreens and articles of clothing.

Another important application includes encapsulated phase change materials which can be used as thermal energy storage products. Such products include fabrics and especially clothing. Of particular value are for example microcapsules comprising a phase change hydrocarbon material which are combined with a fibre spinning dope, which is then extruded to form filaments which are cured and then collected. Since the spinning process normally requires passing the extruded dope into an environment at temperatures often in excess of say 150 or 200° C. and can be even as high as 350° C. or higher, it is desirable for substantially all of the core material to be retained in the shell.

Fibres such as nylon and polyester fibres are produced by melt spun process, which generally involves very high temperatures, for instance in excess of 300 or 350° C. However, it is difficult to find the right chemistry that provides an impervious, durable shell wall that can be incorporated into fibres, without suffering deleterious effects during the spinning process.

Various methods for making capsules have been proposed in the literature. For instance it is known to encapsulate hydrophobic liquids by dispersing the hydrophobic liquid into an aqueous medium containing a melamine formaldehyde pre-condensate and then reducing the pH resulting in an impervious aminoplast resin shell wall surrounding the hydrophobic liquid. Variations of this type of process are described in GB-A-2073132, AU-A-27028/88 and GB-A-1507739, in which the capsules are preferably used to provide encapsulated inks for use in pressure sensitive carbonless copy paper.

However, although capsules based on melamine formaldehyde resins are both impervious and durable, they tend to suffer the disadvantage that they are less impermeable at elevated temperatures. In addition, there is also a risk that formaldehyde is evolved WO-A-9924525 describes microcapsules containing as a core a lipophilic latent heat storage material with a phase transition at −20 to 120° C. The capsules are formed by polymerizing 30 to 100 wt. % C1-24 alkyl ester of (meth) acrylic acid, up to 80 weight % of a di- or multifunctional monomer and up to 40 weight % of other monomers. The microcapsules are said to be used in mineral molded articles. However, the specific polymer compositions described would not be suitable for exposure to high temperatures since the lipophilic phase change material would be very quickly lost. Furthermore, none of the specific polymer compositions are sufficiently strong to withstand high pressures.

US2003118822 describes microcapsules comprising one or more lipophilic substances as core material and a polymeric capsule shell. The lipophilic substances include solid inorganic particles having a mean diameter of between 45 and 1000 nm. The microcapsules are obtained by oil in water emulsion polymerisation of monomers comprising 30 to 100% by weight of C1-C24 alkyl esters of acrylic acid or methacrylic acid with up to 80% by weight of bifunctional or polyfunctional monomer and that is sparingly soluble in water and up to 40% of other monomers. The inorganic particles are said to act as a protective colloid in the stabilisation during the reaction.

WO 2005 002719 describes a method for preparing uniformly sized and shaped microcapsules using a mini emulsion polymerisation. The method employs forming a mini emulsion by mixing a monomer, an emulsifer, an ultrahydrophobe, a low viscosity hydrophobic material, and deionised water. The presence of the ultrahydrophobe is said to stabilise the monomer droplets by osmotic pressure. A long list of possible ultrahydrophobes are suggested including C12 to C20 aliphatic hydrocarbons, C12 to C20 aliphatic alcohols, C12 to C20 alkyl acrylic esters, C12 to C20 alkyl mercaptans, organic dyes, fluorinated alkanes, silicones oil compounds, natural oils, synthetic oils, oligomers with a molecular weight of 1000 to 500,000 and polymers with a molecular weight of 1000 to 500,000. An extensive list of examples are used to illustrate typical ultrahydrophobes all of which are monomeric substances. All of the ultrahydrophobes exemplified are soluble in the core material.

There has been a need for microcapsules that comprise a substantially impervious shell wall that retains a hydrophobic material under conditions of high pressures (generally in excess of 200 psi), especially at elevated temperatures. It would be desirable to provide microcapsules that do not release the hydrophobic core material during the harsh conditions of coating fabrics and after treatment of the coated fabrics. There is also a particular need to provide alternative microcapsules that do not release the core material even when exposed to the harsh conditions, for instance high temperatures during spinning of fibres. There also exists a need for microcapsules that do not release the core material until there has been a suitable release trigger, for instance pH. Nevertheless, the core material would not be released in the absence of the trigger. There is also a need to achieve all of these objectives but avoiding the use of formaldehyde condensation products.

WO-A-01/54809 provides capsules which can easily be incorporated into fibres without suffering the loss of an active core material during the spinning process. The capsules contain a polymeric shell which is formed from a monomer blend comprising A) 30 to 90% by weight methacrylic acid, B) 10 to 70% by weight alkyl ester of (meth)acrylic acid which is capable of forming a homopolymer of glass transition temperature in excess of 60° C. and C) 0 to 40% by weight other ethylenically unsaturated monomer.

Although significant improvements in core retention are obtained there is a need to provide alternative microcapsules that do not release the core material when exposed to very harsh conditions including high temperatures during the spinning of fibres. In particular it will be desirable to achieve this when the microcapsules are subjected to elevated pressures.

There also exists a need for microcapsules that do not release the core material until there has been a suitable release trigger, for instance pH. Nevertheless, the core material would not be released in the absence of the trigger.

There is also a need to achieve all of these objectives but avoiding the use of formaldehyde condensation products.

WO 2005 105291 describes a composition comprising particles which comprise a core material within a polymeric shell, in which the core material comprises a hydrophobic substance. The aforementioned objectives are achieved by using a special combination of features in which the polymeric shell must form at least 8% of the total weight of particles and polymeric shell is formed from a monomer blend that includes 5 to 90% by weight of an ethylenically unsaturated water soluble monomer, 5 to 90% by weight of a multifunctional monomer, and 0 to 55% by weight other monomer and in which the proportions of these monomers are chosen such that the particles exhibit a half height of at least 350° C.

It would be desirable however, to provide microcapsules that also exhibit improved retention of the core material, especially under elevated temperatures and in particular under high pressures. An objective of the present invention is also to achieve this using a greater choice of monomer.

Thus according to the present invention we provide a microcapsule comprising
A) a core containing a hydrophobic liquid or wax,
B) a polymeric shell comprising,
a) a polymer formed from a monomer mixture containing:
  i) 1 to 95% by weight of at least one hydrophobic mono functional ethylenically unsaturated monomer,
  ii) 5 to 99% by weight of at least one polyfunctional ethylenically unsaturated monomer, and
  iii) 0 to 60% by weight of other mono functional monomer,
in which components (i), (ii) and (iii) total 100% and
b) a further hydrophobic polymer which is insoluble in the hydrophobic liquid or wax.

We find that the presence of the further hydrophobic polymer improves the strength of the microcapsules and furthermore tends to improve the impermeability of the shell thus leading to better retention of the core material. This hydrophobic polymer may be embedded within the polymeric shell and/or may be located on the inner surface of the shell. Thus the shell may contain an outer layer of polymeric material formed from the monomer mixture and optionally also containing the further hydrophobic polymer and an inner layer formed from the further hydrophobic polymer. In addition a small part of the hydrophobic polymer may be located throughout the core material. Generally this will be less than 5% of the further hydrophobic polymer. Usually substantially non of the hydrophobic polymer will be present throughout the core material. Preferably, at least a portion of the hydrophobic polymer will be present at the inner surface of the shell wall. It is also preferred that the hydrophobic polymer at least partially coats the inner surface of the shell component derived from the monomer mixture. It has also been found that this hydrophobic polymer may form a substantially coherent layer on the inner surface of the shell and preferably this is a complete layer over the inner surface of the shell.

The hydrophobic liquid includes hydrophobic substances that are liquid at 25° C.

We have found that the microcapsules of the present invention at an unexpectedly stronger capsule shell compared to microcapsules in the absence of the hydrophobic polymer. Such shell resilience is advantageous in terms of withstanding compression for example in the processing of the microcapsules or in the application in the formation of articles and also any harsh treatment of the formed articles.

Also included in the present invention is a process of manufacturing microcapsules comprising
A) a core containing a hydrophobic liquid or wax
B) a polymeric shell comprising,
a) a polymer formed from a monomer blend (mixture) and
b) a hydrophobic polymer which is insoluble in the hydrophobic liquid or wax, comprising the steps,
  1) providing a monomer blend comprising,
    i) 1 to 95% by weight of a hydrophobic mono functional ethylenically unsaturated monomer,
    ii) 5 to 99% by weight of a polyfunctional ethylenically unsaturated monomer, and
    iii) 0 to 60% by weight of other mono functional monomer,
  2) dissolving the hydrophobic polymer into the monomer blend to form a monomer mixture,
  3) combining the monomer mixture with the hydrophobic liquid or molten hydrophobic wax to form a monomer solution,
  4) homogenising the monomer solution into an aqueous phase to form an emulsion,
  5) subjecting the emulsion to polymerisation conditions, and
  6) polymerisation the monomer a dispersion of microcapsules in the aqueous phase.

Although the hydrophobic polymer will dissolve in the monomer blend which is then combined with the hydrophobic liquid or wax to form a monomer solution, as the polymerisation proceeds and the monomer blend polymerises the hydrophobic liquid or wax becomes depleted of monomer blend and the hydrophobic polymer becomes insoluble and precipitates. The hydrophobic polymer may deposit on the internal surface of the shell as it is formed or become embedded within the polymeric shell. By insoluble in the hydrophobic liquid or wax we mean that the hydrophobic polymer is substantially insoluble in the hydrophobic liquid or wax substantially in the absence of the monomer that forms the shell. In general the hydrophobic polymer should be substantially insoluble in the neat hydrophobic liquid or wax at 25° C. Normally the solubility will be less than 2 g/100 cm$^3$ hydrophobic liquid or wax. Preferably the solubility is less than 1 g/100 cm$^3$ and more preferably less than 0.1 g/100 cm$^3$.

The process may employ an emulsifying system, for instance emulsifiers, other surfactants and/or polymerisation stabilisers. Thus in a preferred form of the invention an emulsifier, which may have a high HLB is dissolved into water prior to emulsification of the monomer solution. Alternatively the monomer solution may be emulsified into water with a polymerisation stabiliser dissolved therein. The stabilising polymer may for instance be an amphipathic polymeric stabiliser. The polymerisation stabiliser can be a hydrophilic polymer, preferably a water soluble hydroxy containing polymer, for instance a polyvinyl alcohol or hydroxy ethyl cellulose. Generally it is preferred to use polyvinyl alcohol which has been derived from polyvinyl acetate, wherein between 85 and 95%, preferably 88 to 90% of the vinyl acetate groups have been hydrolysed to vinyl alcohol units.

Other stabilising substances that may be used in the process preferably in addition to the stabilising polymer include ionic monomers. Typical cationic monomers include dialkyl amino alkyl acrylate or methacrylate including quaternary ammonium or acid addition salts and dialkyl amino alkyl acrylamide or methacrylamide including quaternary ammonium or acid addition salts. Typical anionic monomers include ethylenically unsaturated carboxylic or sulphonic monomers such as acrylic acid, methacrylic acid, itaconic acid, allyl sulphonic acid, vinyl sulphonic acid especially alkali metal or ammonium salts. Particularly preferred anionic monomers are ethylenically unsaturated sulphonic acids and salts thereof, especially 2-acrylamido-2-methyl propane sulphonic acid, and salts thereof.

The polymerisation step may be effected by subjecting the aqueous monomer solution to any conventional polymerisation conditions. Generally polymerisation is effected by the use of suitable initiator compounds. Desirably this may be achieved by the use of redox initiators and/or thermal initiators. Typically redox initiators include a reducing agent such as sodium sulphite, sulphur dioxide and an oxidising compound such as ammonium persulphate or a suitable peroxy compound, such as tertiary butyl hydroperoxide etc. Redox initiation may employ up to 1000 ppm, typically in the range 1 to 100 ppm, normally in the range 4 to 50 ppm.

Preferably the polymerisation step is effected by employing a thermal initiatior alone or in combination with other initiator systems, for instance redox initiators. Thermal initiators would include any suitable initiator compound that releases radicals at an elevated temperature, for instance azo compounds, such as azobisisobutyronitrile (AZDN), 4,4'-azobis-(4-cyanovalereic acid) (ACVA) or t-butyl pervivalate or peroxides such as Luperox LP (Dilauroyl Peroxide) (ex Elf Atochem, France). Typically thermal initiators are used in an amount of up 50,000 ppm, based on weight of monomer. In most cases, however, thermal initiators are used in the range 5,000 to 15,000 ppm, preferably around 10,000 ppm. Preferably a suitable thermal initiator with the monomer prior to emulsification and polymerisation is effected by heating the emulsion to a suitable temperature, for instance 50 or 60° C. or higher.

The microcapsules of the present invention desirably may have a weight average particle size diameter less than 10 microns. Generally the average particle size diameter tends to be much smaller, often less than 4 microns and in some cases the average particle diameter will be between 200 nm and 4 microns. Preferably the average particle size diameter is above 1 micron and often in the range above 1 micron and up to 3 microns usually around greater than 1 micron and up to 2 microns. Average particle size is determined by a Sympatec HELOS particle size analyser according to standard procedures well documented in the literature.

In general the polymeric shell component derived from the monomer mixture or blend should form at least 5% by weight based on the total weight of microcapsule. In addition the hydrophobic polymer which is preferably in contact with all distributed throughout the microcapsule polymeric shell component derived from the monomer mixture or blend is typically present in an amount of at least 0.05% and usually at least 0.1% by weight of the microcapsule. Normally the hydrophobic liquid or wax will be present in an amount of at least 40%, and frequently at least 45%, by weight of total microcapsule. Preferably the microcapsule comprises hydrophobic oil or wax forms in an amount between 45 and 94% by weight, 0.05 to 10% by weight hydrophobic polymer that is insoluble in the hydrophobic liquid or wax and the shell in an amount of between 5 and 50% by weight in which components total 100% and all percentages of based on the total weight of the microcapsule.

More preferably the amount of hydrophobic liquid or wax is present in the amount between 60 and 92% by weight of microcapsule and particularly preferably between 70 and 92%, especially between 80 and 90%.

The amount of the aforementioned hydrophobic polymer contained in the microcapsule will more preferably be between 0.1 and 5%, especially between 0.1 and 1% by weight of microcapsule.

The amount of further hydrophobic polymer may generally be present in the microcapsule in an amount between 0.05 and 20% by weight of the total weight of the hydrophobic liquid or wax and hydrophobic polymer. Preferably this will be between 0.1 and 10%, more preferably between 0.2 and 2% by weight of the hydrophobic liquid or wax.

The amount of further hydrophobic polymer alternatively may be defined in terms of the amount of the polymeric shell component derived from the monomer mixture or blend. The further hydrophobic polymer may be present in an effective amount for improving the strength of the shell. Preferably the amount of further hydrophobic polymer in the microcapsule is in an amount of at least 0.2% by weight of the shell component derived from the monomer mixture or blend and preferably between 1 and 40% by weight of the shell component. In particular this will desirably be between 1 and 10% and especially between 1.5 and 5% by weight, based on the weight of the shell component derived from the monomer mixture or blend.

Preferably the shell will form between 8 or 10 and 20% by weight of microcapsule and especially between 10 and 15%.

In view of the presence of at least one polyfunctional ethylenically unsaturated monomer the microcapsule shell should be cross-linked. Generally such cross-linking will render a polymeric shell insoluble although the polymeric shell may be capable of absorbing certain solvent liquids provided that the polymeric shell does not dissolve.

Preferably the hydrophobic mono functional ethylenically unsaturated monomer will be present in the monomer mixture in amount between 30 and 70% by weight of monomer mixture, especially between 40 and 65%. Preferably the polyfunctional ethylenically unsaturated monomer will be present in an amount between 30 and 70% by weight of monomer mixture, particularly between 35 and 60%. It is not essential for any other mono functional monomer to be present but where this is present it is present in an amount up to 40% by weight of monomer mixture and more preferably between 5 and 20% by weight. In some instances it may be desirable to include more than one monomer from each component. For instance it may be desirable to include two or more hydrophobic mono functional ethylenically unsaturated monomers and/or two or more polyfunctional ethylenically unsaturated monomers and/or two or more other mono functional monomers.

The hydrophobic mono functional ethylenically unsaturated monomer may be any suitable monomer that carries one ethylenically group and has a solubility in water of below 5 g per 100 ml of water at 25° C., but usually less than 2 or 1 g/100 $cm^3$. Desirably the hydrophobic monomer will include one or more of styrene or derivatives of styrene, esters of mono ethylenically unsaturated carboxylic acids. Preferably the hydrophobic monomer will include alkyl esters of methacrylic acid or acrylic acid. More preferably the hydrophobic monomer is a C1-12 alkyl ester of acrylic or methacrylic acid. Such hydrophobic monomers may include for instance acrylic or methacrylic esters that are capable of forming a homopolymer that has a glass transition temperature (Tg) of at least 60° C. and preferably at least 80° C. Specific examples of these monomers include styrene, methyl methacrylate, tertiary butyl methacrylate, phenyl methacrylate, cyclohexyl methacrylate and isobornyl methacrylate.

Glass transition temperature (Tg) for a polymer is defined in the Encyclopedia of Chemical Technology, Volume 19, fourth edition, page 891 as the temperature below which (1) the transitional motion of entire molecules and (2) the coiling and uncoiling of 40 to 50 carbon atom segments of chains are both frozen. Thus below its Tg a polymer would not to exhibit flow or rubber elasticity. The Tg of a polymer may be determined using Differential Scanning Calorimetry (DSC).

The polyfunctional ethylenically unsaturated monomer can be any monomer and that induces cross-linking during the polymerisation. Preferably it is a diethylenically unsaturated or polyethylenically unsaturated monomer i.e. carrying two or more ethylenically unsaturated groups. Alternatively the polyfunctional ethylenically unsaturated monomer may contain at least one ethylenically unsaturated group and at least one reactive group capable of reacting with other functional groups in any of the monomer components. Preferably, the multifunctional monomer is insoluble in water or at least has a low water-solubility, for instance below 5 g/100 cm$^3$ at 25° C., but usually less than 2 or 1 g/100 cm$^3$. In addition the multifunctional monomer should be soluble or at least miscible with the hydrocarbon substance of the core material. Suitable multifunctional monomers include divinyl benzene, ethoxylated bisphenol A diacrylate, propoxylated neopentyl glycol diacrylate, tris(2-hydroxyethyl) isocyanurate triacrylate, trimethylolpropane triacrylate and an alkane diol diacrylate, for instance 1,3-butylene glycol diacrylate, 1,6-hexanediol diacrylate but preferably 1,4-butanediol diacrylate.

The other mono functional monomer may be any monomer that has a single polymerisable group. Preferably it will be any ethylenically unsaturated monomer. Typically these other monomers include esters selected from the group consisting of an ethylenically unsaturated carboxylic acid and salts thereof, amino alkyl esters of ethylenically unsaturated carboxylic acid or salts thereof, N-(amino alkyl) derivatives of acrylamide or methacrylamide or salts thereof, other water soluble acrylic monomers including acrylamide, esters of ethylenically unsaturated carboxylic acid, water soluble styrene derivatives, methacrylic acid or salts, acrylic acid or salts, vinyl sulphonic acid or salts, allyl sulphonic acid or salts, itaconic acid or salts, 2-acrylamido-2-methyl propane sulphonic acid or salts, acrylamide and vinyl acetate.

The further hydrophobic polymer which is in contact with the polymeric shell component derived from the monomer mixture should not be cross-linked although it may be branched or otherwise structured, provided that it is soluble in a suitable solvent, for instance the monomer from which it is formed. Preferably the hydrophobic polymer is linear.

Typically the further hydrophobic polymer is formed from a monomer mixture that comprises at least one hydrophobic ethylenically unsaturated monomer. Typically the monomer mixture will include any suitable monomer that carries one ethylenically unsaturated group and has a solubility in water are below 5 g per 100 cm$^3$ of water at 25° C., but usually less than 2 or 1 g/100 cm$^3$. Desirably the hydrophobic monomer will include one or more of styrene or derivatives of styrene, esters of mono ethylenically unsaturated carboxylic acids. Preferably the hydrophobic monomer will include alkyl esters of methacrylic acid or acrylic acid. More preferably the hydrophobic monomer is a C1-12 alkyl ester of acrylic or methacrylic acid. Typical examples of these monomers include styrene, methyl methacrylate, tertiary butyl methacrylate, phenyl methacrylate, cyclohexyl methacrylate and isobornyl methacrylate. It may also be desirable for the monomer mixture to include two or more of these hydrophobic monomers, such as styrene and methyl methacrylate or other acrylic ester.

If the further hydrophobic polymer is structured but soluble in a solvent it may be prepared by including a small amount of polyfunctional ethylenically unsaturated monomer as defined above in regard to the formation of the polymeric shell. Generally such a monomer would be included in an amount less than 1% by weight of monomer mixture, generally less than 500 parts per million and frequently less time 100 parts per million, for instance between 0.5 and 10 parts per million. The exact amount of polyfunctional monomer and the polymerisation conditions should be chosen in such a way that the resulting polymer will be soluble in a suitable solvent. Preferably substantially no polyfunctional monomer is included in the monomer mixture. It is preferred that the hydrophobic polymer is formed from the same hydrophobic mono functional ethylenically unsaturated monomer (i) and optionally other mono functional monomer (iii) there is used in the monomer blend that forms the polymeric shell. More preferably the hydrophobic polymer is formed from components (i) and (iii) but in the absence of any polyfunctional ethylenically unsaturated monomer. More preferably still the hydrophobic polymer is formed entirely from one or more hydrophobic mono functional ethylenically unsaturated monomer or monomers (i) in the absence of other mono functional or polyfunctional monomers. It is especially preferred that the hydrophobic mono functional ethylenically unsaturated monomer or monomers of the same as those mono functional ethylenically unsaturated monomers (i) used in the monomer blend to form the shell a set in the absence of components (ii) and (iii). A particularly preferred hydrophobic polymer is a polymer of styrene, preferably the homopolymer of styrene.

The hydrophobic polymer may be prepared by conventional techniques, such as those outlined for the preparation of poly(styrene) in Vogel (Third Edition, published by Longmans (1962)). The weight average molecular weight will usually be at least 200. It may be as high as one million but is usually no more than 500,000. In general the weight average molecular weight will be within 500 and 100,000 and normally between 500 and 50,000, especially between 600 and 5,000.

The microcapsule may contain other components if desired. In particular it is often desirable to include a stabilising polymer. Such a stabilising polymer will generally be located at the outer surface of the microcapsule shell. The stabilising polymer may be as defined above. Other stabilizing polymers which may be included and may be located at the outer surface of the microcapsule include polymers of one or more water soluble anionic and water soluble cationic monomers as described above.

The microcapsules of the present invention comprises a core within a polymeric shell, in which the core comprises a hydrophobic liquid or wax and art or all of a core material. Other materials may be included in the core, for instance additives which modify the properties of the hydrophobic liquid or wax. The other materials present in the core material may be hydrophilic and suspended in the hydrophobic liquid or wax, for instance inorganic salt hydrates. Alternatively the other additives may be polymeric additives which are miscible or soluble in the hydrophobic liquid or wax. Generally where included in the core these other materials will form no more than 10% by weight of the total core material. Often the other materials form less than 5% of the core normally less than 2%, for instance 0.5 to 1.5%. Thus the core will generally comprise at least 90% of the hydrophobic liquid or wax. Preferably the amount of hydrophobic liquid or wax comprised in the core will be more than 95% by weight, more preferably more than 98%, in particular 98.5 to 99.5%.

The core material may comprise an active ingredient selected from the group consisting of UV absorbers, UV reflectors, flame retardants, active dye tracer materials, pigments, dyes, colorants, enzymes, detergent builders and fragrances. Generally within the context of the present invention it would be unnecessary for the active ingredient to be released. For instance encapsulated pigments may be used in pigmented articles, such as ceramics, where it would be important for the pigment not to be released. There is also an application for encapsulated colorants, i.e. dyes and pigments for many other applications, for instance in preparing textile products. Thus the microcapsules comprising a pigment or dye can be incorporated into or adhered to a fibre or textile article. The colour would be held by the microcapsules and there would be no risk of colour leaching. Alternatively the encapsulated colorant may be applied to packaging materials, for instance food packaging. Thus shaded paper or board used in food packaging may be prepared by including the encapsulated pigments or dyes into the paper making process. Typically the colorants can be C.I. Pigment Violet 19, C.I. Pigment Blue 15, C.I. Pigment Blue 60, C.I. Pigment Red 177 as described in WO-A-00/61689

Alternative applications of encapsulated pigments includes cosmetics, for instance as described in U.S. Pat. No. 5,382,433, U.S. Pat. No. 5,320,835 or WO-A-98/50002. Typically the colorants can be mica, talc, D&C Red 7 Calcium Lake, D&C Red 6 Barium Lake, Iron Oxide Red, Iron Oxide Yellow, D&C Red 6 Barium Lake, Timiron MP-1001, Mineral (Carnation White), Helindon Pink, Red 218, Japan Blue No. 1 Al lake, Polysiloxane-treated Titanium mica.

In a further aspect of the invention we provide microcapsules which no not release the core material and/or active ingredient until a suitable trigger mechanism has occurred. In this case the trigger is an increase in pH to above pH 10.

Thus such alkali releasable microcapsules may be applied in a variety of applications where the use of high pH may be used as a release mechanism. The active ingredient may also be a substance that is to be released in to an aqueous environment. This may be recirculating water such as in cooling water systems, which are normally operated under alkali conditions. Suitable actives for release into aqueous systems include antiscalents, corrosion inhibitors, biocides, dispersants, and antioxidants.

Generally the hydrophobic liquid or wax comprised in the core may be an organic material. For instance the hydrophobic liquid may be an oil or a molten wax. Preferably the hydrophobic liquid or wax is a non-polymeric material. More preferably the hydrophobic liquid or wax is a hydrocarbon. The oil or wax may contain active materials, such as UV absorbers, UV reflectors, or flame retardants dispersed or dissolved therein. Thus the core material may a homogenous or alternatively may comprise a dispersion of solid active material dispersed throughout a continuous core medium of hydrophobic liquid or wax. When the core material comprises a phase change material, generally the phase change material is an oil or a wax which is liquid at a temperature between $-30°$ C. and $150°$ C.

Typical examples of flame retardants suitable for the present invention include bromobenzoates as described in U.S. Pat. No. 5,728,760 and halogenated phosphates, thiophosphates or thiophosphoryl chlorides as given in U.S. Pat. No. 3,912,792.

Suitable ultra violet light absorbers of the present invention include naphthalene-methylenemalonic diesters, for instance as mentioned in U.S. Pat. No. 5,508,025 or compositions comprising mixtures of benzotriazoles and 2-hydroxy benzophenones as claimed by U.S. Pat. No. 5,498,345.

When the core material is a phase change substance it may be for instance any known hydrocarbon that melts at a temperature of between $-30$ and $150°$ C. Generally the substance is a wax or an oil and preferably has a melting point at between 20 and $80°$ C., often around $40°$ C. Desirably the phase change substance may be a $C_{8-40}$ alkane or may be a cycloalkane. Suitable phase change materials include all isomers of the alkanes or cycloalkanes. In addition it may also be desirably to use mixtures of these alkanes or cycloalkanes. The phase change material may be for instance any of the compounds selected from n-octadecane, n-tetradecane, n-pentadecance, n-heptadecane, n-octadecane, n-nonadecane, n-docosane, n-tricosane, n-pentacosane, n-hexacosane, cyclohexane, cyclooctane, cyclodecane and also isomers and/or mixtures thereof.

In a preferred form of the invention the core consists essentially of a hydrophobic liquid or wax, for instance at least 90%, which is a non-polymeric material, for instance an oil or wax, in particular a phase change material. Although the preferred hydrophobic liquid or wax is a phase change material which is essentially non-polymeric, it is within the scope of the present invention for a smaller amounts of polymeric additives to be included within the phase change non-polymeric material. Usually this will be in amounts of less than 10% by total weight of core and often will be less than 5, for instance 0.5 to 1.5 or 2% by weight. A particularly desirable polymeric additive is a substance that will modify the properties of the phase change material. For instance it is known that the temperature at which a phase change material melts on absorbing heat can be significantly different from the temperature at which it solidifies when losing heat. Thus a particularly desirable polymeric additive would be a substance which will bring the melting and solidifying temperatures closer together. This minimisation of the shift in melting/freezing point of the phase change material may be important in various domestic applications or for garments.

Alternatively the phase change material comprised in the core could be a substance other than a hydrocarbon.

The phase change material could be an inorganic substance that aborbs and desorbs latent heat during a liquifying and solidifying phase transition. The inorganic substance may be a compound which releases or absorbs heat during a dissolving/crystallisation transition. Such inorganic compounds include for instance sodium sulphate decahydrate or calcium chloride hexahydrate. Thus the inorganic phase change material may be any inorganic substance that can absorb or desorb thermal energy during a transition at a particular temperature. The inorganic phase change material may be in the form of finely dispersed crystals which are dispersed throughout the core matrix which comprises a hydrophobic liquid or wax. In one form the inorganic phase change material is dispersed throughout a solid hydrophobic substance such as a wax.

Alternatively the hydrophobic liquid or wax comprised in the core remains substantially liquid and contains crystals of the inorganic phase change material dispersed throughout the liquid. Preferably the hydrophobic liquid is a hydrocarbon. During a phase change the crystals become liquid droplets dispersed throughout the liquid. It may be advantageous to include a suitable surfactant, such as a water in oil emulsifier into the hydrophobic liquid in order to prevent coalescence of the dispersed droplets of liquid. Preferably the inorganic phase change material is dispersed throughout a matrix of hydrocarbon phase change material which is a wax or an oil. In this preferred embodiment the hydrocarbon and inorganic materials may both absorb or desorb heat. Alternatively the hydrocarbon phase may be a carrier oil that is not necessarily a phase change material. In this instance the carrier oil may be a process aid.

When the hydrophobic liquid or wax is a phase change material used for thermal storage in may be used in conjunction with a suitable nucleating agent to prevent supercooling, for instance as described in U.S. Pat. No. 5,456,852 or for instance in International patent application PCT/EP 2006/066934 unpublished at the date of filing of the present application.

The microcapsules of the present invention may be used in a variety of applications including textiles (for instance within the body of the fibre or alternatively coating the fibre or textile), automotive applications (including use in circulatory cooling fluids or a coolant within the interior design), construction industry (for instance in passive or active ventilation systems), or heat transfer fluids (as a capsule within a modified heat transfer fluid). It is possible to incorporate the microcapsules of the present invention into any suitable article, for instance fibres, textile products, ceramics, coatings etc. Thus a further aspect of the present invention we provide an article comprising microcapsules. Hence according to the invention it is possible to provide an article which comprises encapsulated flame retardants, UV absorbers, active dye tracer materials or phase change material. In the case of encapsulated flame retardants it would be desirable for the flame retardant to be retained during any processing steps such as fibre formation.

Thus in a further aspect of the present invention we provide an article comprising microcapsules each comprising
A) a core containing a hydrophobic liquid or wax
B) a polymeric shell comprising
a) a polymer formed from a monomer mixture containing:
  i) 1 to 95% by weight of a hydrophobic mono functional ethylenically unsaturated monomer,
  ii) 5 to 99% by weight of a polyfunctional ethylenically unsaturated monomer, and
  iii) 0 to 60% by weight of other mono functional monomer, and
b)) a further hydrophobic polymer which is insoluble in the hydrophobic liquid or wax.

The article may be a textile product or a paper or board packaging material or a shaped mineral article. Furthermore, it is possible to provide an article which comprises encapsulated flame retardants, UV absorbers, active dye tracer materials or phase change material. In the case of encapsulated flame retardants it would be desirable for the flame retardant to be retained during any processing steps such as fibre formation, involving temperatures of for instance, between 150° C. to about 350° C. but then released when exposed to the excessive temperatures in excess of say above 400 or 500° C. In a preferred embodiment of the invention the microcapsules comprise a core material that contains both a phase change material, which is a wax or an oil and dispersed or dissolved therein a flame retarding substance. Thus in one preferred form of the invention the presence of the flame retardant in the capsule would prevent or reduce the risk of phase change material from igniting if released under excessive temperatures.

In a further aspect of the present invention we provide a coating composition comprising microcapsules each comprising
A) a core containing a hydrophobic liquid or wax,
B) a polymeric shell comprising
a) a polymer formed from a monomer mixture containing:
  i) 1 to 95% by weight of a hydrophobic mono functional ethylenically unsaturated monomer,
  ii) 5 to 99% by weight of a polyfunctional ethylenically unsaturated monomer, and
  iii) 0 to 60% by weight of other mono functional monomer, and
b) a further hydrophobic polymer which is insoluble in the hydrophobic liquid or wax.

The coating composition may be used for any suitable substrate, such as paper, wood, metal, plastics, ceramics and the like. Preferably the composition is for coating a textile and can for instance be a polyurethane or polyacrylic textile coating composition. Typically, the coating composition of the present invention is prepared by combining the particulate composition of the present invention with a conventional coating composition (e.g. acrylic or polyurethane textile coating composition) which comprises conventional ingredients used in conventional amounts. The coating composition is a formulation which is desirably prepared by mixing between 30 and 90% by weight of the dry particulate microcapsules of the present invention and between 10 and 70% by weight of a conventional polyurethane or polyacrylic textile coating composition. Preferably the coating formulation comprises between 60 and 80% by weight dry microcapsules and between 20 and 40% by weight of the conventional polyurethane or polyacrylic textile coating composition. A particularly preferred coating formulation is prepared containing 70% of the dry capsule and 30% of a polyurethane or polyacrylic textile coating.

We also provide a process of coating a fabric comprising the steps of
1) providing a textile coating composition,
2) applying the coating composition to a surface of the fabric, and
3) drying the coating to provide a coated fabric,
in which the coating composition comprises a particulate composition which comprises microcapsules which microcapsules comprise
A) a core containing a hydrophobic liquid or wax,
B) a polymeric shell comprising
a) a polymer formed from a monomer mixture containing:
  i) 1 to 95% by weight of a hydrophobic mono functional ethylenically unsaturated monomer,
  ii) 5 to 99% by weight of a polyfunctional ethylenically unsaturated monomer, and
  iii) 0 to 60% by weight of other mono functional monomer, and
b) a further hydrophobic polymer which is insoluble in the hydrophobic liquid or wax.

Typically the composition comprising the dry microcapsules of the invention and conventional textile coating, for instance as described above, is prepared and where required stirred for sufficient time to distribute the microcapsules throughout the coating composition, for example 10 minutes, and then substantially immediately coated onto the fabric. The fabric may be a woven fabric or alternatively can be a non-woven fabric. Usually the coating applied to the fabric would be at least 50 g/m$^2$ and may be as much as 180 g/m$^2$. Generally a coat weight of 80 to 120 g/m$^2$, especially around 100 g/m$^2$ is usually desired. Typically in the laboratory, the coating can be applied using many different well known techniques used in industry. The coating can be applied using a k-bar. The coated fabric can then be dried in a suitable drying apparatus, for instance at a temperature of between 100° C. and 200° C. for up to 10 minutes to dry and cure the coating. Generally the coated fabric may be calendared using in excess of 200 psi (e.g. 250 psi) pressure In order to demonstrate that the active material is retained within the capsules in the coated fabric, microcapsules can be incorporated into a textile coating formulation, coated on to fabric and then calendared using in excess of 200 psi (e.g. 250 psi) pressure then subjected to continuous heating and cooling (thermocycling) above and below the melting temperature of the wax, and for instance for octadecane this can be from 10° C. to 60° C. for 50 times. The coated fabric can then be washed using a hydrocarbon solvent e.g. hexane and the enthalpy of the coated microcapsules is measured using Differential Scanning Calorimetry. This is compared to the enthalpy of the original coated capsules before calendaring and continuous heating and cooling has taken place.

Further articles according to the invention include fibres and fabrics formed from said fibres, wherein the fibres comprise microcapsules which microcapsules comprise
A) a core containing a hydrophobic liquid or wax,
B) a polymeric shell comprising,
a) a polymer formed from a monomer mixture containing:
  i) 1 to 95% by weight of a hydrophobic mono functional ethylenically unsaturated monomer,
  ii) 5 to 99% by weight of a polyfunctional ethylenically unsaturated monomer, and
  iii) 0 to 60% by weight of other mono functional monomer, and
b) a further hydrophobic polymer which is insoluble in the hydrophobic liquid or wax.

In this aspect of the invention the fibres comprise said microcapsules distributed within the matrix of the fibre. Generally the diameters of the microcapsules should be less than half of the cross-sectional diameter of the fibre. Generally, if the microcapsules are much larger there is a risk that the presence of such large capsules in the fibres could result in the fibres which tend to break at the position of the microcapsule. Typically the microcapsules will have a particle size diameter less than 30%, preferably less than 10% of the diameter of the fibre.

The fibres comprising the microcapsules of the present invention can be made by incorporating the microcapsules into the spinning dope. The spinning dope can then be spun according to standard spinning techniques, for instance as described in EP-A-269393. Generally the spinning dope is then passed through an orifice into a heated atmosphere where the extruded dope is cured to form a fibre, which is then collected.

The microcapsules comprised in the composition of the present invention are suitable for incorporating into any fibres, for instance acrylics, polyesters, nylon, polypropylene.

According to this aspect of the invention we provide a process of forming a fibre containing microcapsules comprising the steps of,
1) combining said microcapsules with a liquid spinning dope,
2) extruding the spinning dope,
3) passing extruded dope through an atmosphere at a temperature of at least 150° C. and
4) collecting formed fibres,
wherein the microcapsules comprise
A) a core containing a hydrophobic liquid or wax
B) a polymeric shell comprising,
a) a polymer formed from a monomer mixture containing:
  i) 1 to 95% by weight of a hydrophobic mono functional ethylenically unsaturated monomer,
  ii) 5 to 99% by weight of a polyfunctional ethylenically unsaturated monomer, and
  iii) 0 to 60% by weight of other mono functional monomer, and
b) a further hydrophobic polymer which is insoluble in the hydrophobic liquid or wax.

Desirably the polymeric microcapsules are sufficiently impermeable to the hydrophobic liquid or wax contained in the core so that during the formation of the fibre the high temperature conditions do not result in any significant loss of the hydrophobic liquid or wax. We have surprisingly found that the core material is able to retain most or all of the core material even when the polymeric microcapsules are exposed to a spinning temperature in excess of 150° C. This has also been found to be the case even when the spinning temperature is much higher, for instance in excess of 200° C. Thus we find that the microcapsules retain at least 98% by weight, preferably 99%, of the hydrophobic liquid or wax when passed though the spinning process.

A particularly important application of the present invention relates to incorporation of the capsules in fibres, which microcapsules contain a phase change substance as the core material. The durability and impermeability of the polymeric shell towards the phase change material enables the microcapsules to be incorporated into fibres without any significant loss of the phase change material. The impregnated fibres containing phase change material can then be woven into textile products. The textile products can include items of clothing and other fabrics.

The following are examples.

Examples

Preparative Process

Poly(styrene) solution as the hydrophobic polymer.

A poly(styrene) solution was prepared by dissolving poly(styrene) 10 g (from Dajac: Molecular weight ~1000) in styrene monomer 90 g. This mixture was stirred until the polymer fully dissolved.

Example 1

Hydrophobic Oil (Containing Added Polymer) Microencapsulation

An oil phase was prepared by mixing styrene 4.94 g, methacrylic acid 2.3 g, poly(styrene) solution 4.76 g (prepared as above) and butane diol diacrylate 7.89 g. Alperox LP 1.4 g (ex ELF Atochem) was added followed by hydrophobic liquid 152 g.

An aqueous phase was prepared by mixing poly(vinyl alcohol) 5.4 g (Gohsenol GH20R ex Nippon Gohseii), water 169 g and Sodium AMPS 0.64 g (50% active ex Lubrizol, France).

The aqueous phase and the oil phase were warmed to 40° C. and emulsified together using a Silverson L4R laboratory homogeniser. After ten minutes a stable emulsion was obtained.

The resultant emulsion was poured into a reaction vessel, equipped for polymerisation, situated in a water bath at 75° C. This temperature was maintained for three hours and an aqueous ammonium persulphate solution (0.6 g in 10 g water) was added. The polymerising mass was heated to 80° C. and after stirring at this temperature for two hours, cooled to room temperature to yield the final product. The final product was a dispersion of wax cored, polymer shelled microcapsules in water of an average particle size of 3 microns.

Example 2 (Comparative)

Hydrophobic Oil (Containing No Added Polymer) Microencapsulation

An oil phase was prepared by mixing styrene 4.94 g, methacrylic acid 2.3 g, and butane diol diacrylate 7.89 g. Alperox LP 1.4 g (ex ELF Atochem) was added followed by hydrophobic liquid 152 g.

An aqueous phase was prepared by mixing poly(vinyl alcohol) 5.4 g (Gohsenol GH20R ex Nippon Gohseii), water 169 g and Sodium AMPS 0.64 g (50% active ex Lubrizol, France).

The aqueous phase and the oil phase were warmed to 40° C. and emulsified together using a Silverson L4R laboratory homogeniser. After ten minutes a stable emulsion was obtained.

The resultant emulsion was poured into a reaction vessel, equipped for polymerisation, situated in a water bath at 75° C. This temperature was maintained for three hours and an aqueous ammonium persulphate solution (0.6 g in 10 g water) was added. The polymerising mass was heated to 80° C. and after stirring at this temperature for two hours, cooled to room temperature to yield the final product. The final product was a dispersion of wax cored, polymer shelled microcapsules in water of an average particle size of 2.5 microns.

Analysis

Particle Size

Particle size analysis was carried out using a Sympatec Analyser (ex Sympatec GmbH) set up with a Quixcel dispersion system and R4 lens.

Thermo-Gravimetric Analysis (TGA)

Thermo-gravimetric analysis was conducted using a Perkin Elmer TGA with a temperature range of 110° C. to 500° C.

Results

1: Effect of Insoluble Polymer Addition

TABLE 1

| Polymer incorporation level[3] (%) | Particle Size/μm | | TGA | |
|---|---|---|---|---|
| | D50 | D90 | Half-height (° C.)[1] | Mass Loss at 300° C. (%)[2] |
| 0 | 1.9 | 5 | 334 | 11 |
| 0.45 | 3.1 | 8.9 | 375 | 4.7 |
| 2.4 | 2.68 | 5 | 406 | 4.8 |
| 2.4 (repeat) | 2 | 3.8 | 369 | 9.5 |
| 4.8 | 3.35 | 9 | 384 | 9.3 |

[1]Half height: this is the half-height of the decay curve.
[2]Mass loss @ 300° C.: this is the amount of material lost (expressed as a percentage) from the sample between the starting condition, 110° C., and 300° C.
[3]Based on total weight of polymer shell.(monomers plus hydrophobic polymer). The effect of hydrocarbon insoluble polymer introduction can been seen by comparison of the half-height values in the table—the higher the half-height, the more resistant the microcapsules to rupture due to build up of internal pressure i.e. the more robust the wall.

2: Effect of Soluble Polymer Addition

TABLE 2

| Type | Polymer Incorporation level[3] (%) | Particle Size/ μm | | TGA | |
|---|---|---|---|---|---|
| | | $D_{50}$ | $D_{90}$ | Half-height (° C.)[1] | Mass Loss at 300° C. (%)[2] |
| None | 0 | 1.9 | 5 | 334 | 11 |
| Hydrocarbon Soluble[a] | 4.8 | 1.7 | 48 | 325 | 52 |
| Hydrocarbon Insoluble (Poly(styrene)) | 4.8 | 3.4 | 9.0 | 384 | 9.3 |

[a]Polymer is poly(stearyl methacrylate-co-Bisomer MPEG350A) 90:10 wt:wt as a 40% solution in hydrocarbon.

From the results, the inclusion of a hydrocarbon soluble polymer caused a deterioration in the properties of the microcapsule (as measured by the effective mass loss) compared with the positive effect of the incorporation of a hydrocarbon insoluble polymer.

The invention claimed is:

1. A microcapsule comprising
   A) a core containing a hydrophobic liquid or wax in an amount of 45 to 94% by weight of the total weight of the microcapsule,
   B) the polymeric shell having an outer surface and an inner surface, wherein the polymeric shell comprises,
   a) a polymer formed from a monomer mixture containing:
      i) 1 to 95% by weight of a hydrophobic mono functional ethylenically unsaturated monomer, wherein the hydrophobic mono functional ethylenically unsaturated monomer is $C_1$ to $C_{12}$ alkyl esters of acrylic acid, $C_1$ to $C_{12}$ alkyl esters of methacrylic acid, styrene or derivatives of styrene, or esters of mono ethylenically unsaturated carboxylic acids,
      ii) 5 to 99% by weight of a polyfunctional ethylenically unsaturated monomer, wherein the polyfunctional ethylenically unsaturated monomer is divinyl benzene, ethoxylated bisphenol A diacrylate, propoxylated neopentyl glycol diacrylate, tris(2-hydroxyethyl) isocyanurate triacrylate, trimethylolpropane triacrylate, or an alkane diol diacrylate, and
      iii) 0 to 60% by weight of other mono functional monomer,
   in which components (i), (ii) and (iii) total 100%,
   wherein the polymer is present in an amount of 5 to 50% by weight of the total weight of the microcapsule, and
   b) a further hydrophobic polymer which is insoluble in the hydrophobic liquid or wax,
   wherein the further hydrophobic polymer is $C_1$ to $C_{12}$ alkyl esters of acrylic acid, $C_1$ to $C_{12}$ alkyl esters of methacrylic acid, styrene or derivatives of styrene, or esters of mono ethylenically unsaturated carboxylic acids,
   wherein the further hydrophobic polymer is present in an amount of 0.05 to 10% by weight of the total weight of the microcapsule, and
   wherein the hydrophobic liquid or wax, polymer formed from the monomer mixture and the further hydrophobic polymer total 100% by weight of the total weight of the microcapsule.

2. The microcapsule according to claim 1 in which a stabilizing polymer is located at an outer surface of the polymeric shell in which the stabilizing polymer is a water-soluble hydroxyl containing polymer.

3. The microcapsule according to claim 2 in which the stabilizing polymer is a polyvinyl alcohol.

4. The microcapsule according to claim 1 in which the hydrophobic liquid or wax is a hydrocarbon.

5. The microcapsule according to claim 1 in which the hydrophobic liquid or wax is an oil or wax that has a melting point at a temperature between −30° C. and 150° C.

6. The microcapsule according to claim 1 in which the core contains an active ingredient selected from the group consisting of UV absorbers, UV reflectors, flame retardants, active dye tracer materials, pigments, dyes, colorants, scale inhibitors, corrosion inhibitors, antioxidants, pour point depressants, wax deposition inhibitors, dispersants, biocides, enzymes, detergent builders, fragrances, phase change materials and silicone oils.

7. The microcapsule according to claim 1 in which the further hydrophobic polymer that is insoluble in the hydrophobic liquid or wax is present in an amount between 0.05 and 20% by weight of the total weight of the hydrophobic liquid or wax and further hydrophobic polymer.

8. The microcapsule according to claim 1 in which the further hydrophobic polymer that is insoluble in the hydrophobic liquid or wax at least partially coats the inner surface of the polymeric shell component formed from the monomer mixture.

9. The microcapsule according to claim 1 in which the further hydrophobic polymer that is insoluble in the hydrophobic liquid or wax forms a coherent layer on the inner surface of the polymeric shell component formed from the monomer mixture.

10. The microcapsule according to claim 9 in which the further hydrophobic polymer forms a complete layer over the inner surface of the polymeric shell component formed from the monomer mixture.

11. The microcapsule according to claim 1 in which the polymeric shell forms between 10 and 20% by weight of the total weight of the microcapsule.

12. The microcapsule according to claim 1 in which the weight average particle size diameter is greater than 1 micron and up to 4 microns.

13. A process of manufacturing microcapsules comprising the microcapsules comprising
   A) a core containing a hydrophobic liquid or wax in an amount of 45 to 94% by weight of the total weight of the microcapsule,
   B) a polymeric shell having an outer surface and an inner surface, wherein the polymeric shell comprises,
   a) a polymer formed from a monomer mixture containing:
   i) 1 to 95% by weight of a hydrophobic mono functional ethylenically unsaturated monomer, wherein the hydrophobic mono functional ethylenically unsaturated monomer is $C_1$ to $C_{12}$ alkyl esters of methacrylic acid, styrene or derivatives of styrene, or esters of mono ethylenically unsaturated carboxylic acids,
   ii) 5 to 99% by weight of a polyfunctional ethylenically unsaturated monomer, wherein the polyfunctional ethylenically unsaturated monomer is divinyl benzene, ethoxylated bisphenol A diacrylate, propoxylated neopentyl glycol diacrylate, tris(2-hydroxyethyl) isocyanurate triacrylate, trimethylolpropane triacrylate, or an alkane diol diacrylate, and
   iii) 0 to 60% by weight of other mono functional monomer,
   in which components (i), (ii) and (iii) total 100%,
   wherein the polymer is present in an amount of 5 to 50% by weight of the total weight of the microcapsule, and
   b) a further hydrophobic polymer which is insoluble in the hydrophobic liquid or wax, wherein the further hydrophobic polymer is $C_1$ to $C_{12}$ alkyl esters of methacrylic acid, styrene or derivatives of styrene, or esters of mono ethylenically unsaturated carboxylic acids,
   wherein the further hydrophobic polymer is present in an amount of 0.05 to 10% by weight of the total weight of the microcapsule, and
   wherein the hydrophobic liquid or wax, polymer formed from the monomer mixture and the further hydrophobic polymer total 100% by weight of the total weight of the microcapsule;
   comprising the steps,
      1) providing the monomer mixture, 2) dissolving the further hydrophobic polymer into the monomer mixture, 3) combining the further hydrophobic polymer and the monomer mixture with the hydrophobic liquid or wax to form a monomer solution, 4) homogenizing the monomer solution into an aqueous phase to form an emulsion, 5) subjecting the emulsion to polymerization conditions, and 6) polymerization of the monomer solution to form a dispersion of the microcapsules in the aqueous phase.

14. The process according to claim 13 in which the monomer solution is subjected to free radical polymerization.

15. The process according to claim 13 in which a thermal initiator is combined with the monomer solution and the emulsion is heated to a temperature of at least 50° C. for sufficient time to effect polymerization.

16. The process according to claim 13 in which a stabilizing polymer is included in the aqueous phase.

17. The process according to claim 13 in which the stabilizing polymer is a water-soluble hydroxyl containing polymer.

18. The process according to claim 17 in which the emulsion is maintained at a temperature of between 50 and 80° C. for a period of between 90 and 150 minutes and then subjected to a temperature of at least 80° C. for a period of at least 30 minutes.

19. An article comprising microcapsules, each microcapsule comprising
   A) a core containing a hydrophobic liquid or wax in an amount of 45 to 94% by weight of the total weight of the microcapsule,
   B) the polymeric shell having an outer surface and an inner surface, wherein the polymeric shell comprises
   a) a polymer formed from a monomer mixture containing:
   i) 1 to 95% by weight of a hydrophobic mono functional ethylenically unsaturated monomer, wherein the hydrophobic mono functional ethylenically unsaturated monomer is $C_1$ to $C_{12}$ alkyl esters of acrylic acid, $C_1$ to $C_{12}$ alkyl esters of methacrylic acid, styrene or derivatives of styrene, or esters of mono ethylenically unsaturated carboxylic acids,
   ii) 5 to 99% by weight of a polyfunctional ethylenically unsaturated monomer, wherein the polyfunctional ethylenically unsaturated monomer is divinyl benzene, ethoxylated bisphenol A diacrylate, propoxylated neopentyl glycol diacrylate, tris(2-hydroxyethyl) isocyanurate triacrylate, trimethylolpropane triacrylate, or an alkane diol diacrylate, and
   iii) 0 to 60% by weight of other mono functional monomer,
   in which components (i), (ii) and (iii) total 100%,
   wherein the polymer is present in an amount of 5 to 50% by weight of the total weight of the microcapsule, and
   b) a further hydrophobic polymer which is insoluble in the hydrophobic liquid or wax,
   wherein the further hydrophobic polymer is $C_1$ to $C_{12}$ alkyl esters of acrylic acid, $C_1$ to $C_{12}$ alkyl esters of methacrylic acid, styrene or derivatives of styrene, or esters of mono ethylenically unsaturated carboxylic acids,
   wherein the further hydrophobic polymer is present in an amount of 0.05 to 10% by weight of the total weight of the microcapsule, and
   wherein the hydrophobic liquid or wax, polymer formed from the monomer mixture and the further hydrophobic polymer total 100% by weight of the total weight of the microcapsule.

20. A coating composition comprising microcapsules, each microcapsule comprising
   A) a core containing a hydrophobic liquid or wax in an amount of 45 to 94% by weight of the total weight of the microcapsule,
   B) the polymeric shell having an outer surface and an inner surface, wherein the polymeric shell comprises,
   a) a polymer formed from a monomer mixture containing:
   i) 1 to 95% by weight of a hydrophobic mono functional ethylenically unsaturated monomer, wherein the hydrophobic mono functional ethylenically unsaturated monomer is $C_1$ to $C_{12}$ alkyl esters of acrylic acid, $C_1$ to $C_{12}$ alkyl esters of methacrylic acid, styrene or derivatives of styrene, or esters of mono ethylenically unsaturated carboxylic acids, ii) 5 to 99% by weight of a polyfunctional ethylenically unsaturated monomer, wherein the polyfunctional ethylenically unsaturated monomer is divinyl benzene, ethoxylated bisphenol A diacrylate, propoxylated neopentyl glycol diacrylate, tris(2-hydroxyethyl) isocyanurate triacrylate, trimethylolpropane triacrylate, or an alkane diol diacrylate, and iii) 0 to 60% by weight of other mono functional monomer, in which components (i), (ii) and (iii) total 100%, wherein the polymer is present in an amount of 5 to 50% by weight of the total weight of the microcapsule, and b) a further hydrophobic polymer which is insoluble in the hydrophobic liquid or wax, wherein the further hydrophobic polymer is $C_1$ to $C_{12}$ alkyl esters of acrylic acid, $C_1$ to $C_{12}$ alkyl esters of methacrylic acid, styrene or derivatives of styrene, or esters of mono ethylenically unsaturated carboxylic acids, wherein the further hydrophobic polymer is present in an amount of 0.05 to 10% by weight of the total weight of the microcapsule, and wherein the hydrophobic liquid or wax, polymer formed from the monomer mixture and the further hydrophobic polymer total 100% by weight of the total weight of the microcapsule.

21. A process of coating a fabric comprising the steps of
1) providing a textile coating composition,
2) applying the coating composition to a surface of the fabric, and
3) drying the coating to provide a coated fabric,
in which the coating composition comprises microcapsules, each microcapsule comprising A) a core containing a hydrophobic liquid or wax in an amount of 45 to 94% by weight of the total weight of the microcapsule, B) a polymeric shell having an outer surface and an inner surface, wherein the polymeric shell comprises, a) a polymer formed from a monomer mixture containing:

i) 1 to 95% by weight of a hydrophobic mono functional ethylenically unsaturated monomer, wherein the hydrophobic mono functional ethylenically unsaturated monomer is $C_1$ to $C_{12}$ alkyl esters of methacrylic acid, styrene or derivatives of styrene, or esters of mono ethylenically unsaturated carboxylic acids, ii) 5 to 99% by weight of a polyfunctional ethylenically unsaturated monomer, wherein the polyfunctional ethylenically unsaturated monomer is divinyl benzene, ethoxylated bisphenol A diacrylate, propoxylated neopentyl glycol diacrylate, tris(2-hydroxyethyl) isocyanurate triacrylate, trimethylolpropane triacrylate, or an alkane diol diacrylate, and iii) 0 to 60% by weight of other mono functional monomer, in which components (i), (ii) and (iii) total 100%, wherein the polymer is present in an amount of 5 to 50% by weight of the total weight of the microcapsule, and b) a further hydrophobic polymer which is insoluble in the hydrophobic liquid or wax, wherein the further hydrophobic polymer is $C_1$ to $C_{12}$ alkyl esters of methacrylic acid, styrene or derivatives of styrene, or esters of mono ethylenically unsaturated carboxylic acids, wherein the further hydrophobic polymer is present in an amount of 0.05 to 10% by weight of the total weight of the microcapsule, and wherein the hydrophobic liquid or wax, polymer formed from the monomer mixture and the further hydrophobic polymer total 100% by weight of the total weight of the microcapsule;

22. Fibres comprising microcapsules, each microcapsule comprising

A) a core containing a hydrophobic liquid or wax in an amount of 45 to 94% by weight of the total weight of the microcapsule, B) the polymeric shell having an outer surface and an inner surface, wherein the polymeric shell comprises a) a polymer formed from a monomer mixture containing:

i) 1 to 95% by weight of a hydrophobic mono functional ethylenically unsaturated monomer, wherein the hydrophobic mono functional ethylenically unsaturated monomer is $C_1$ to $C_{12}$ alkyl esters of acrylic acid, $C_1$ to $C_{12}$ alkyl esters of methacrylic acid, styrene or derivatives of styrene, or esters of mono ethylenically unsaturated carboxylic acids, ii) 5 to 99% by weight of a polyfunctional ethylenically unsaturated monomer, wherein the polyfunctional ethylenically unsaturated monomer is divinyl benzene, ethoxylated bisphenol A diacrylate, propoxylated neopentyl glycol diacrylate, tris(2-hydroxyethyl) isocyanurate triacrylate, trimethylolpropane triacrylate, or an alkane diol diacrylate, and iii) 0 to 60% by weight of other mono functional monomer, in which components (i), (ii) and (iii) total 100%, wherein the polymer is present in an amount of 5 to 50% by weight of the total weight of the microcapsule, and b) a further hydrophobic polymer which is insoluble in the hydrophobic liquid or wax, wherein the further hydrophobic polymer is $C_1$ to $C_{12}$ alkyl esters of acrylic acid, $C_1$ to $C_{12}$ alkyl esters of methacrylic acid, styrene or derivatives of styrene, or esters of mono ethylenically unsaturated carboxylic acids, wherein the further hydrophobic polymer is present in an amount of 0.05 to 10% by weight of the total weight of the microcapsule, and wherein the hydrophobic liquid or wax, polymer formed from the monomer mixture and the further hydrophobic polymer total 100% by weight of the total weight of the microcapsule.

* * * * *